United States Patent
Knetsch et al.

(10) Patent No.: US 11,235,633 B2
(45) Date of Patent: Feb. 1, 2022

(54) ROLL STABILIZER FOR A MOTOR VEHICLE

(71) Applicant: SCHAEFFLER TECHNOLOGIES AG & CO. KG, Herzogenaurach (DE)

(72) Inventors: Dustin Knetsch, Erlangen (DE); Mario Arnold, Aurachtal (DE); Michael Klebl, Erlangen (DE); Silvia Kutzberger, Erlangen (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 14 days.

(21) Appl. No.: 16/083,607

(22) PCT Filed: Mar. 8, 2017

(86) PCT No.: PCT/DE2017/100182
§ 371 (c)(1),
(2) Date: Sep. 10, 2018

(87) PCT Pub. No.: WO2017/152912
PCT Pub. Date: Sep. 14, 2017

(65) Prior Publication Data
US 2019/0100066 A1   Apr. 4, 2019

(30) Foreign Application Priority Data
Mar. 10, 2016 (DE) .......................... 102016203950.4

(51) Int. Cl.
*B60G 13/16* (2006.01)
*B60G 15/04* (2006.01)
(Continued)

(52) U.S. Cl.
CPC ............. *B60G 13/16* (2013.01); *B60G 15/04* (2013.01); *B60G 21/0555* (2013.01);
(Continued)

(58) Field of Classification Search
CPC .... B60G 13/16; B60G 15/04; B60G 21/0555; B60G 2202/25; B60G 2202/42;
(Continued)

(56) References Cited

U.S. PATENT DOCUMENTS 921,471 A * 5/1909 Shilling ................. B60G 13/04
267/214
2,773,698 A * 12/1956 Slemmons ............. B60G 9/003
280/678

(Continued)

FOREIGN PATENT DOCUMENTS

CN 101370678 A 2/2009
DE 1953028 U 1/1967
(Continued)

OTHER PUBLICATIONS

International Search Report for International Application No. PCT/DE2017/100182 dated May 18, 2017.

*Primary Examiner* — Frank B Vanaman
(74) *Attorney, Agent, or Firm* — Rutan & Tucker LLP; Hani Z. Sayed

(57) ABSTRACT

A roll stabilizer for a motor vehicle includes a torsion bar and a vibration damper located on the torsion bar. The vibration damper is configured to vibrate relative to the torsion bar. The vibration damper includes two half-shells formed together about the torsion bar. Damper elements are disposed between the half-shells. The damper elements can be adjusted via an adjustment component to alter the rigidity of the damper elements.

10 Claims, 2 Drawing Sheets

(51) Int. Cl.
   *B60G 21/055* (2006.01)
   *F16F 7/112* (2006.01)
(52) U.S. Cl.
   CPC .......... *F16F 7/112* (2013.01); *B60G 2202/25* (2013.01); *B60G 2202/42* (2013.01); *B60G 2202/442* (2013.01); *B60G 2204/41* (2013.01); *B60G 2204/61* (2013.01); *B60G 2206/73* (2013.01)
(58) Field of Classification Search
   CPC .......... B60G 2202/442; B60G 2204/41; B60G 2204/61; B60G 2206/73; B60G 2600/44; F16F 7/104
   See application file for complete search history.

(56) References Cited

U.S. PATENT DOCUMENTS

| | | | | |
|---|---|---|---|---|
| 4,648,620 | A * | 3/1987 | Nuss | B60G 21/0553 280/124.106 |
| 5,413,374 | A * | 5/1995 | Pierce | B60G 7/00 267/141.2 |
| 5,685,555 | A * | 11/1997 | McCormick | B60G 13/04 267/196 |
| 5,772,188 | A * | 6/1998 | Lund | F16F 1/46 267/69 |
| 6,095,486 | A * | 8/2000 | Ivers | F16F 9/46 137/909 |
| 6,435,531 | B1 * | 8/2002 | Acker | B60G 11/20 280/124.107 |
| 6,695,102 | B1 * | 2/2004 | Marjoram | F16F 9/535 188/267.2 |
| 8,613,452 | B2 | 12/2013 | Grau et al. | |
| 2006/0125165 | A1 * | 6/2006 | Niwa | B60G 21/0551 267/293 |
| 2008/0042377 | A1 * | 2/2008 | Beetz | B60G 21/0555 280/5.511 |
| 2008/0067727 | A1 * | 3/2008 | Schwarz | B60G 21/0551 267/141.1 |
| 2011/0140378 | A1 * | 6/2011 | Grau | B60G 21/0555 280/5.508 |

FOREIGN PATENT DOCUMENTS

| | | | |
|---|---|---|---|
| DE | 19741535 A1 | 3/1999 | |
| DE | 102015008952 B3 | 7/2016 | |
| DE | 102016011753 A1 | 3/2017 | |
| FR | 2710381 A1 | 3/1995 | |
| FR | 2883349 A1 * | 9/2006 | .......... F16F 15/1435 |
| KR | 20110022199 A | 3/2011 | |

* cited by examiner

ROLL STABILIZER FOR A MOTOR VEHICLE

CROSS-REFERENCE TO RELATED APPLICATIONS

This application is the U.S. National Phase of PCT/DE2017/100182 filed Mar. 8, 2017, which claims priority to DE 102016203950.4 filed Mar. 10, 2016, the entire disclosures of which are incorporated by reference herein.

TECHNICAL FIELD

This disclosure relates to a roll stabilizer for a motor vehicle. Roll stabilizers of this type stabilize a vehicle body when cornering, and counteract a swaying of the vehicle body. The disclosure relates in particular to an active roll stabilizer, which comprises an actuator, which can actively apply a torque to a torsion bar of the roll stabilizer, in order to counteract the swaying of the vehicle body.

BACKGROUND

Active roll stabilizers of this type are known from DE102008033270 A1. The roll stabilizer disposed transverse to the vehicle longitudinal axis has a divided torsion bar with an actuator functionally disposed between the two ends facing one another. These roll stabilizers are mounted on the vehicle body. Sounds emitted from the roll stabilizer while the vehicle is moving have been observed, which could be regarded as disruptive in the passenger compartment.

SUMMARY

The object of the present disclosure is to create a roll stabilizer which counteracts disruptive noises. This problem is solved according to embodiments described herein.

The roll stabilizer according to the disclosure for a motor vehicle is provided with a torsion bar. This torsion bar can be attached to the wheel mounts at its ends in the known manner. There is vibration damper according to the disclosure, which has an oscillating damper element and a damper spring disposed between the roll stabilizer and the damper element.

Roll stabilizers according to the disclosure counteract undesired noises: the vibration damper prevents or reduces vibrations of the roll stabilizer, which is normally supported by stabilizer bearings on the vehicle body. The damper element can form a pendulum with the damper spring, the resonant frequency of which is adjusted to vibrating frequencies that are to be eliminated. The vibration damper can execute sufficiently large deflections at these frequencies. The vibration damper draws vibrating energy from the roll stabilizer at these frequencies for its own vibrations. The vibrations of the roll stabilizer are substantially transverse to the axis of the roll stabilizer.

It has been observed that the resonant vibrations of the roll stabilizer depend on the type of vehicle and the structural design of the roll stabilizer with regard to the rotational orientation and frequency of the vibrations.

For this reason, a functional design of the disclosure includes a vibration damper with a preferred vibrational axis in which the damper element of the vibration damper can oscillate. If the main direction of the vibrating frequency of the roll stabilizer is known, the vibration damper can be disposed accordingly, such that the main direction of the vibrating frequency and the preferred vibrational axis of the vibration damper coincide.

In one embodiment, the vibration damper can be oriented in any rotational direction with respect to the longitudinal axis of the roll stabilizer, in order to align the preferred vibrational axis with the main direction of the vibration frequency of the roll stabilizer. The effective orientation of the vibration damper is therefore arbitrary in this further development.

In one embodiment, the vibration damper can have an adjustment component for adjusting the rigidity of the damper spring. As specified above, the vibrating frequencies of the roll stabilizers may vary. Frequencies between approx. 150 Hz and 350 Hz have been observed, for example, depending on the type of vehicle and the structural design. By adjusting the rigidity of the damper spring in a targeted manner, the resonant frequency of the vibration damper can be adjusted to the determined vibrating frequency.

The damper spring may be an elastomer component, which is attached at one end to the roll stabilizer and at the other end to the damper element. Elastomer components of this type can be produced economically in any shape, e.g. as a plate. An elastomer can be used with a Shore hardness appropriate to the application for which it is intended. For the purposes of the disclosure, Shore hardnesses of approx. 60 to 80 Shore is provided in one embodiment. The elastomer component can have an exposed spring section, one end of which is attached to the roll stabilizer, and the other end of which is attached to the damper element. When the exposed spring section is regarded as an oscillating bar, the rigidity of the damper spring can be at least approximately determined using typical calculating methods, wherein the thickness of the exposed spring section and the exposed length of spring between the damper element and the roll stabilizer can be incorporated in the rigidity in each case to the third power, thus having a large influence on the spring rigidity.

The damper element can have numerous components, wherein the damper spring is clamped between these components, and is also retained on the roll stabilizer. The damper spring, preferably in the form of a plate-shaped elastomer component can be clamped between the damper elements. It has been established that the rigidity of this damper spring changes as a function of the clamping force, and thus the resonant frequency of the vibration damper can be adjusted to the vibrating frequency of the roll stabilizer.

The vibration damper can have a retention device for attaching it to the roll stabilizer. By way of example, an economical retention device in the manner of a pipe clamp can be formed, which is clamped to the torsion bar. The pipe clamp type attachment allows the vibration damper to be held in an arbitrary rotational orientation to the longitudinal axis of the roll stabilizer. The damper spring can be attached in this case to a retaining bracket on the retention device with adhesives or through vulcanizing.

In one embodiment, a plate-shaped elastomer component serving as a damper spring can be attached to the retention device at a longitudinal edge, with a clamping section on both sides of the plate being clamped between the components, wherein an exposed spring section of the plate-shaped elastomer component is located between the longitudinal edge and the clamping section. The vibrational axis of the vibration damper is transverse to the plate-shaped elastomer component in this case. The damper element can vibrate transverse to the torsion bar, and deflect the exposed spring section of the plate-shaped elastomer component. With this further development, it may be useful to attach a longitudinal edge of the elastomer component to the retaining bracket of the retention device with adhesive or through vulcanizing.

A further embodiment provides that a plate-shaped elastomer component is attached to the damper element at a longitudinal edge, and attached to the retaining bracket at the opposite longitudinal edge. In this case, the clamping section is eliminated, and the exposed spring section determines the rigidity of the damper spring.

The adjustment component can have at least one adjusting screw, which bears against one component at one end, and is screwed at the other end into the other component to clamp the damper spring therebetween. It has been discovered that by varying the clamping force of a plate-shaped elastomer component serving as a damper spring, the rigidity thereof can be adjusted to the disruptive frequencies of the roll stabilizer that are to be eliminated.

The roll stabilizer according to the disclosure can have a divided torsion bar, wherein an actuator is disposed between the parts of the torsion bar, and is connected to both torsion bar parts in order to transfer torque.

The vibration damper can be disposed selectively on the actuator or on the torsion bar, or on angled bar sections connected to the wheel mounts, depending on the available space. These angled bar sections are part of the torsion bar, or are permanently connected to the torsion bar.

BRIEF DESCRIPTION OF THE FIGURES

The disclosure shall be explained in greater detail below based on an exemplary embodiment illustrated in a total of eight figures. Therein.

DETAILED DESCRIPTION

Figure 1:
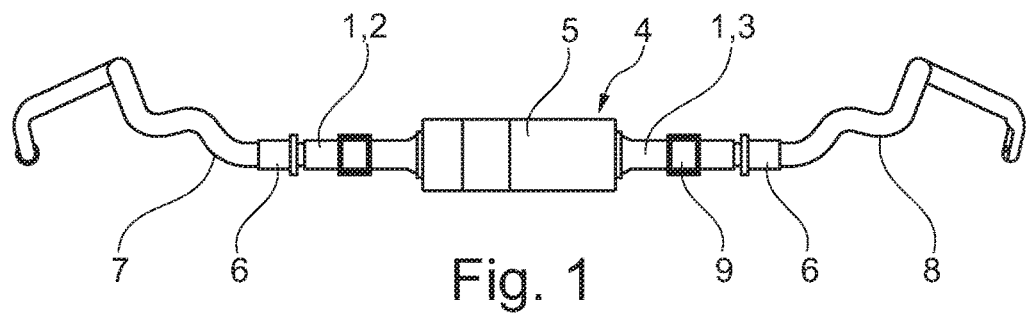
FIG. 1 shows a roll stabilizer according to one embodiment.

The roll stabilizer illustrated in FIG. 1 has a divided torsion bar 1 comprising torsion bar parts 2, 3 disposed end to end, between which an actuator 4 is functionally disposed. The actuator 4 has an electric motor (not shown) with a gearing, the output shaft of which is connected to one torsion bar part 2 for conjoint rotation therewith, wherein a housing 5 of the actuator 4 is connected to the other torsion bar part 3 for conjoint rotation therewith. A torque can be applied to the torsion bar 1 through actuation of the actuator 4. The torsion bar 1 is supported on a vehicle body (not shown) via two stabilizer bearings 6. Angled torsion bar ends 7, 8 are connected in the known manner to wheel mounts (not shown).

Both torsion bar parts 2, 3 each have a vibration damper 9, which shall be explained in greater detail below.

Figure 2:
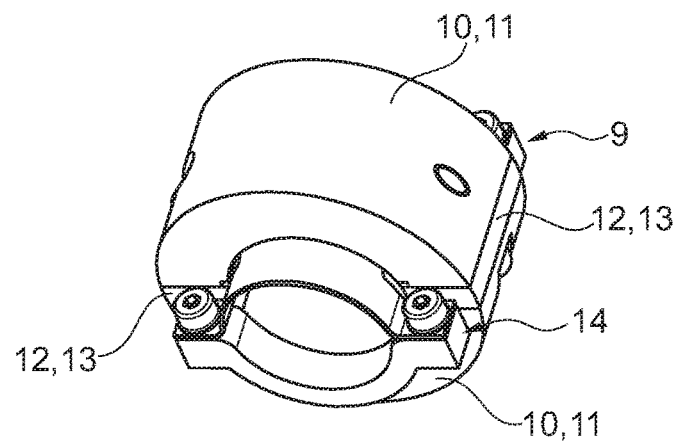
FIG. 2 shows a perspective view of a vibration damper for the roll stabilizer according to FIG. 1.

FIG. 2 shows the vibration damper 9 in a perspective view. It has a damper element 10, formed here by two half-shell components 11, forming an annular clamp. A damper spring 12 is clamped between two opposing ends of the two components 11, formed in the exemplary embodiment by a plate-shaped elastomer component 13. A retention device 14 for clamping the vibration damper 9 to the torsion bar parts 2, 3 is also provided, which shall be described in greater detail below.

Figures 3, 4, 5:
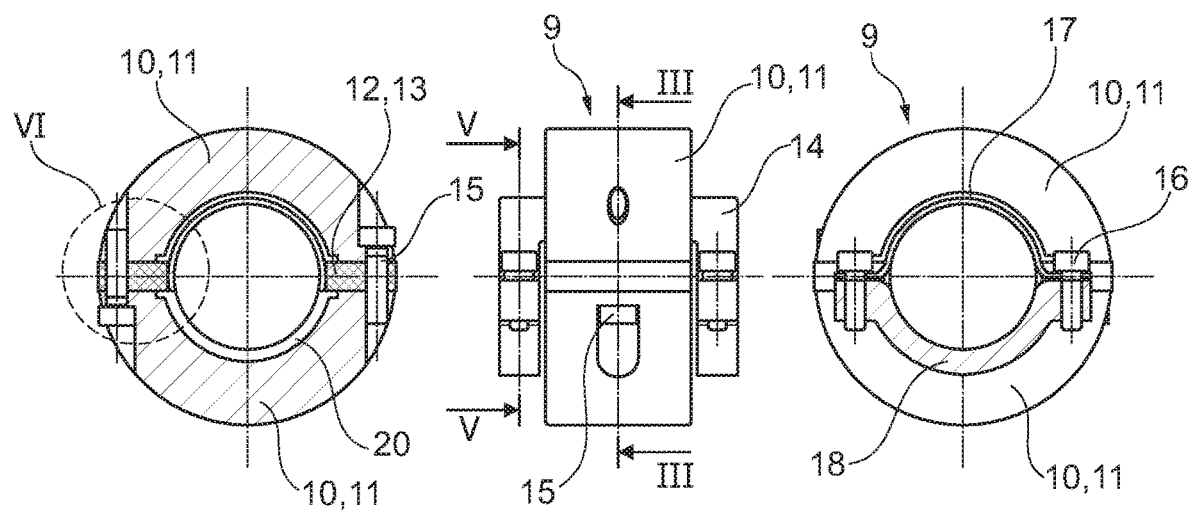
FIG. 3 shows the vibration damper according to FIG. 2 in a cross section along the line in FIG. 4.
FIG. 4 shows the vibration damper according to FIG. 2.
FIG. 5 shows the vibration damper according to FIG. 2 in a cross section along the line V-V in FIG. 4.

FIG. 3 clearly shows that the two components 11 are screwed together with adjusting screws 15. The clamping of the plate-shaped elastomer component 13 depends on the how tightly the adjusting screws are turned. It can be derived from FIGS. 2 and 3 that the elastomer components 13 bear in a planar manner at their sides on the circumferential ends of the components 11. The axial lengths of the elastomer components 3 correspond in the exemplary embodiment to the lengths of the components 11. A small annulus 20 can be seen in FIG. 3, formed between the damper element 10 and the torsion bar parts 2, 3 (not shown). This annulus 20 allows the damper element 10 to vibrate transverse to the torsion bar, with a resilient deformation of the damper spring 12.

FIGS. 4 and 5 clearly show clamping screws 16 of the retention device 14, which are used to attach the upper retaining clamps 17 to the lower retaining brackets 18. When the clamping screws 16 are tightened, the retaining bracket 18 and the upper retaining clamp 17 are pressed against the torsion rod parts 2, 3 (not shown). As a result, it is possible to secure the vibration damper 9 in an arbitrary rotational orientation on the tube-shaped torsion bar parts 2, 3 with this retention device 14.

Figure 6:
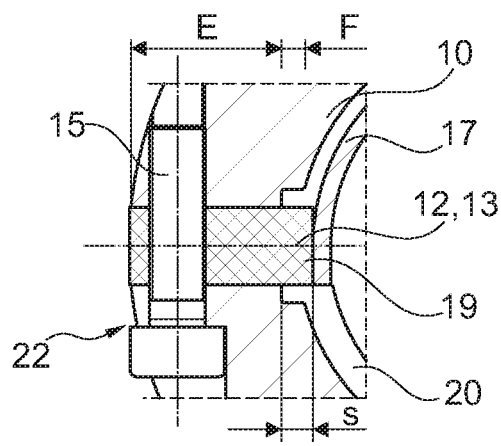
FIG. 6 shows an enlarged section of section VI in FIG. 3.

FIG. 6 shows an enlargement of a detail in FIG. 3 showing the attachment of the damper spring 12 at one end to the retention device 14, and at the other end to the damper element 10. The plate-shaped elastomer component 13 is attached by means of adhesive in the exemplary embodiment to a circumferential section of the upper retaining clamp 17 at is longitudinal edge 19. It can be clearly seen here in particular that the plate-shaped elastomer component 13 has an exposed spring section F with a spring length s. This spring section F extends over the entire length of the elastomer component 13. The rest of the elastomer component 13 is clamped at a clamping section E between the two components 11. The retaining clamp 17 is axially long enough in the exemplary embodiment that the elastomer component can be glued to the retaining clamp 17 along the entire length of its longitudinal edge 19.

Figure 7:
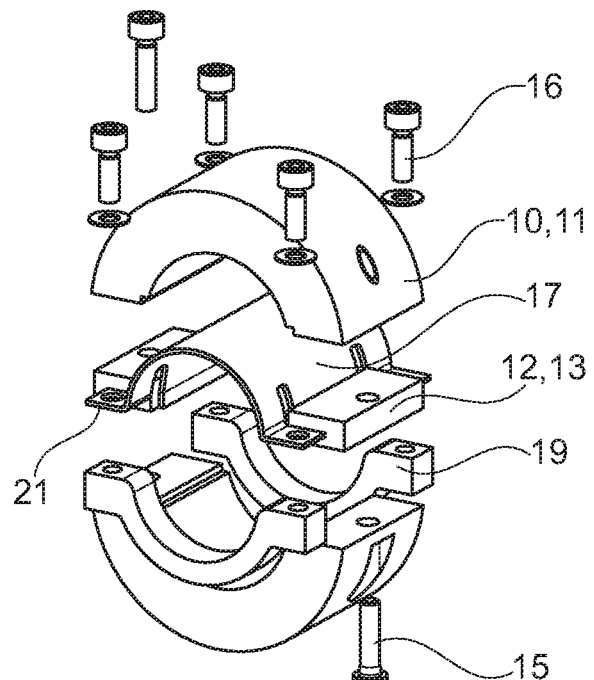
FIG. 7 shows the vibration damper from FIG. 2 in an exploded view.

FIG. 7 clearly shows the individual parts of the vibration damper 9 in an exploded view. In particular, it can be clearly seen that the plate-shaped elastomer component 13 is disposed axially between angled flaps 21 on the upper retaining clamp 17, provided for receiving screws.

Figure 8:
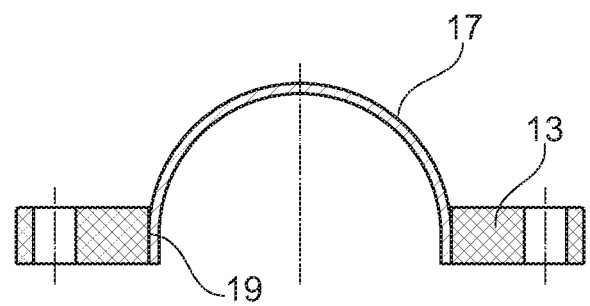
FIG. 8 shows details of the vibration damper according to FIG. 2.

FIG. 8 clearly shows the plate-shaped elastomer component 13 permanently secured to the upper retaining clamp 17.

The vibration damper 9 described herein has a preferred direction of vibration transverse to the plate-shaped elastomer component 19, which is deflected in a resilient manner at its exposed spring section F when the damper element 10 vibrates. The length s of the spring is substantially selected to determine the appropriate resonant frequency of the vibration damper 9; the length s of the spring is incorporated to the third power in calculating the resonant frequency. The length s of the spring therefore substantially determines the rigidity of the damper spring 12.

The two components 11 of the damper element 10 collectively form an adjustment component 22 with the adjusting screws 15, by means of which the rigidity of the damper spring 12 can likewise be adjusted. It has been discovered that the clamping tension applied to the plate-shaped elastomer component 13 has a substantial effect on the rigidity thereof. Accordingly, a precise resonant frequency for the vibration damper 9 can be set by means of the adjusting screws 15.

The type of vibration of the vibration damper can be indicated depending on the installation orientation of the tangential vibration transverse to the torsion bar.

In one variation, the vibration dampers described herein can also be attached to the angled ends 7, 8 of the torsion bars, or to the housing 5 of the actuator 4.

LIST OF REFERENCE SYMBOLS

1 torsion bar
2 torsion bar part
3 torsion bar part
4 actuator
5 housing
6 stabilizer bearing
7 torsion bar end
8 torsion bar end
9 vibration damper
10 damper element
11 component
12 damper spring
13 plate-shaped elastomer component
14 retention device
15 adjusting screw
16 clamping screw
17 upper retaining clamp
18 retaining bracket
19 longitudinal edge
20 annulus
21 flap
22 adjustment component

The invention claimed is:

1. A roll stabilizer for a vehicle, comprising:
a torsion bar; and
a vibration damper located on the torsion bar, the vibration damper configured to vibrate relative to the torsion bar, the vibration damper including:
first and second half-shell components forming an annular clamp about the torsion bar, wherein the first half-shell component ends in first planar end surfaces, and the second half-shell component ends in second planar end surfaces,
first and second damper elements, each located between and directly contacting one of the first planar end surfaces and one of the second planar end surfaces, and
an adjustment component configured to adjust a rigidity of the damper elements.

2. The roll stabilizer of claim 1, wherein the first and second damper elements are made of an elastomer.

3. The roll stabilizer of claim 1, wherein the adjustment component includes a screw configured to, when tightened, decrease a distance between the first and second half-shell components and alter a rigidity of the damper elements.

4. The roll stabilizer of claim 1, further comprising a retaining clamp between the first and second half-shell components.

5. The roll stabilizer of claim 4, wherein the first and second damper elements are attached to the retaining clamp via an adhesive or via vulcanization.

6. A vibration damper comprising:
first and second half-shell components, wherein the first half-shell component ends in first planar end surfaces, and the second half-shell component ends in second planar end surfaces each facing respective first planar end surfaces,
first and second damper elements, each located between and directly contacting one of the first planar end surfaces and the respective second planar end surface,
an adjustment component configured to adjust a rigidity of the damper elements; and
a retaining clamp between the first and second half-shell components, wherein the first and second damper elements are attached to the retaining clamp via an adhesive or via vulcanization.

7. The vibration damper of claim 6, wherein the first and second damper elements are made of an elastomer.

8. The vibration damper of claim 6, wherein the adjustment component includes at least one screw configured to, when tightened, decrease a distance between the first and second half-shell components thereby altering a rigidity of the damper elements.

9. A roll stabilizer for a motor vehicle, comprising:
a torsion bar;
a vibration damper having a damper element configured to vibrate in relation to the torsion bar, wherein the damper element includes first and second of half-shell components collectively forming an annular clamp, wherein a first planar end surface for the first half-shell component faces a second planar end surface of the second half-shell component; and
a damper spring functionally disposed between the torsion bar and the damper element, wherein the damper spring is located and clamped directly between the first and second planar end surfaces;
wherein the damper spring is made of an elastomer component which is retained at a first side on the roll stabilizer, and on a second side on the damper element; and
further wherein the elastomer component is plate-shaped and is attached at a longitudinal edge to a retention device, and is clamped between the half-shell components on both sides thereof, wherein there is an exposed spring section of the plate-shaped elastomer component disposed between the longitudinal edge and the clamping section.

10. A roll stabilizer according to claim 9, further comprising:
the retention device having a retaining clamp to which the longitudinal edge of the elastomer component is attached with adhesive or through vulcanization.

\* \* \* \* \*